US012636843B2

(12) United States Patent
Janiak et al.

(10) Patent No.: US 12,636,843 B2
(45) Date of Patent: May 26, 2026

(54) METHOD FOR MANUFACTURING AN ELECTRO-OPTICAL COMPONENT AND ELECTRO-OPTICAL COMPONENT

(71) Applicant: Fraunhofer-Gesellschaft zur Förderung der angewandten Forschung e.V., Munich (DE)

(72) Inventors: Klemens Janiak, Berlin (DE); Norbert Keil, Berlin (DE); Moritz Kleinert, Berlin (DE); Gerrit Fiol, Berlin (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 428 days.

(21) Appl. No.: 18/099,636

(22) Filed: Jan. 20, 2023

(65) Prior Publication Data

US 2023/0234310 A1       Jul. 27, 2023

(30) Foreign Application Priority Data

Jan. 21, 2022     (DE) ..................... 10 2022 101 386.3

(51) Int. Cl.
*G02F 1/035*          (2006.01)
*B29D 11/00*         (2006.01)

(52) U.S. Cl.
CPC ........ B29D 11/00663 (2013.01); G02F 1/035 (2013.01); G02F 2202/20 (2013.01)

(58) Field of Classification Search
CPC .......................... B29D 11/00663; G02F 1/035; G02F 2202/20
See application file for complete search history.

(56) References Cited

U.S. PATENT DOCUMENTS 6,735,370 B1 *   5/2004  Da Silva Marques ......................
                                                   G02B 6/136
                                                       385/129
2008/0253728 A1    10/2008  Sparacin et al.
(Continued)

FOREIGN PATENT DOCUMENTS

WO          2019218385 A1     11/2019
WO          2020143712 A1      7/2020

OTHER PUBLICATIONS

Chang et al., "Heterogeneous integration of lithium niobate and silicon nitride waveguides for wafer-scale photonic integrated circuits on silicon", Optics Letters, 2017, pp. 803-806, vol. 42:4.
(Continued)

*Primary Examiner* — Uyen Chau N Le
*Assistant Examiner* — Hoang Q Tran
(74) *Attorney, Agent, or Firm* — The Webb Law Firm

(57)          ABSTRACT

Provided is a method for manufacturing an optical component, including the following steps: producing at least one optical waveguide or a part of an optical waveguide on a substrate, where producing the optical waveguide or the part of the optical waveguide includes producing a waveguide core or a portion of a waveguide core, and where the waveguide core or the portion of the waveguide core includes silicon nitride, a polymer or a III-V semiconductor material; and arranging at least one layer of lithium niobate on a side of the waveguide core or of the portion of the waveguide core facing away from the substrate. After arranging at least one layer of lithium niobate at least one of the following steps is carried out: structuring at least one layer of lithium niobate, producing a further portion of the waveguide core and/or arranging at least one contact structure for electrically contacting the at least one layer of lithium niobate.

12 Claims, 2 Drawing Sheets

(56)               References Cited

U.S. PATENT DOCUMENTS

| | | |
|---|---|---|
| 2019/0331941 A1 | 10/2019 | Coolbaugh et al. |
| 2021/0124233 A1 | 4/2021 | Liang et al. |
| 2021/0278595 A1* | 9/2021 | Kumar .................... G02F 1/035 |
| 2021/0364696 A1 | 11/2021 | Reano et al. |
| 2022/0390808 A1* | 12/2022 | Lee ....................... G02F 1/2257 |

OTHER PUBLICATIONS

Weigel et al., "Lightwave Circuits in Lithium Niobate through Hybrid Waveguides with Silicon Photonics", Scientific Reports, 2016, pp. 1-9, vol. 6.

* cited by examiner

METHOD FOR MANUFACTURING AN ELECTRO-OPTICAL COMPONENT AND ELECTRO-OPTICAL COMPONENT

CROSS REFERENCE TO RELATED APPLICATION

This application claims priority to German Patent Application No. 10 2022 101 386.3 filed Jan. 21, 2022, the disclosure of which is hereby incorporated by reference in its entirety.

BACKGROUND OF THE INVENTION

Field of the Invention

The disclosure relates to a method for manufacturing an electro-optical component and to an electro-optical component.

Description of Related Art

From the prior art passive optical waveguides are known, which have a waveguide core made of silicon that is covered with a layer of lithium niobate. Such optical waveguides are described for example in the article "Lightwave Circuits in Lithium Niobate through Hybrid Waveguides with Silicon Photonics", P. Weigel et. al, Sci. Rep. 6, 22301; doi: 10.1038/srep22301 (2016).

The problem underlying the proposed solution consists in providing optical components as efficient as possible.

SUMMARY OF THE INVENTION

This problem is solved by providing a method with features as described herein and an electro-optical component with features as described herein.

Accordingly, there is provided a method for manufacturing an optical component, in particular an electro-optical component, the method including the following steps:

producing at least one optical waveguide or a part of an optical waveguide on a substrate, wherein producing the optical waveguide or the part of the optical waveguide comprises producing a waveguide core or a portion of a waveguide core, wherein the waveguide core or the portion of the waveguide core includes silicon nitride, a polymer or a III-V semiconductor material;

arranging at least one layer of lithium niobate on a side of the waveguide core or of the portion of the waveguide core facing away from the substrate, wherein after arranging the at least one layer of lithium niobate, at least one of the following steps is carried out:

structuring the at least one layer of lithium niobate, producing a further portion of the waveguide core and/or arranging at least one contact structure for electrically contacting the at least one layer of lithium niobate.

The combination of an optical waveguide, whose core includes a material with a low electro-optical coefficient, with a layer of lithium niobate in particular provides for an efficient manufacture of highly integrated phase-shifting components. For example, active electro-optical components with an electro-optical efficiency as high as possible can be realized with optical losses at low as possible.

The waveguide core or the part of the waveguide core includes e.g. silicon nitride ($Si_3N_4$). Silicon nitride shows a large transparency window (in particular in the wavelength range of 0.4 to 6.7 μm) with a very low absorption for light. It can be applied for instance on silicon (Si) substrates with silicon dioxide ($SiO_2$) layers, e.g. by means of gas phase deposition (LPCVD), and can subsequently be structured e.g. via dry etching methods (for example RIE—Reactive Ion Etching). The material system of silicon nitride on silicon oxide represents e.g. a platform for optical waveguides and in particular integrated optical networks. The possible losses for such waveguides lie at few dB/m. Silicon nitride, however, has no significant electro-optical effect so that a phase-changing effect might be achieved only thermally or indirectly by means of piezoelectric effects. Both are very slow. Lithium niobate (LN) on the other hand has a very strong electro-optical effect ($r_{33}>30$ pm/V) and likewise a large transparency window (0.35 to 4.5 μm), which is why the manufacture of electro-optically active waveguides is possible by combination of an optical waveguide e.g. on the basis of $Si_3N_4$—$SiO_2$ with a layer of lithium niobate. However, the solution is not limited to $Si_3N_4$—$SiO_2$ waveguides. Rather, the optical waveguide might also be manufactured on a polymer basis or on the basis of a III-V semiconductor material. In this case, the waveguide core includes a polymer or a III-V semiconductor material (e.g. a quaternary material such as e.g. InGaAsP).

The layer of lithium niobate is present e.g. as a crystal layer (for example with a thickness of less than 500 μm or less than 300 μm) or is configured as LN-on-Insulator (LNOI), wherein the lithium niobate layer is disposed in particular on a silicon dioxide layer arranged on a wafer made of silicon.

According to one aspect of the solution, the layer of lithium niobate is connected to the optical waveguide or to the part of the optical waveguide (in particular to the waveguide core or to the part of the waveguide core) by means of a bonding method. The layer of lithium niobate is present in particular as a layer on a separate substrate, e.g. in the form of said LNOI layer. It is conceivable that the bonding method comprises connecting the layer of lithium niobate to the optical waveguide or the part of the optical waveguide by means of at least one intermediate layer. The intermediate layer includes for example a polymer, such as BCB—benzocyclobutene. It is also possible, however, that the layer of lithium niobate is directly connected (bonded) to the optical waveguide or the part of the optical waveguide without an intermediate layer.

The substrate on which the optical waveguide or the part of the optical waveguide is arranged for example is a first wafer, on which several optical waveguides or several parts of optical waveguides are produced at the same time for manufacturing a plurality of optical components, wherein to each component at least one optical waveguide or at least a part of an optical waveguide is associated. The first wafer is formed e.g. of silicon or another semiconductor material (e.g. indium phosphide) and/or has e.g. a diameter of at least 5 cm. In addition, the layer of lithium niobate initially can be arranged on a second wafer (e.g. made of silicon, as already mentioned above), wherein the second wafer is removed after carrying out the bonding method. The bonding of the layer of lithium niobate to the waveguide or the part of the waveguide is effected in particular before splitting the first wafer into sections with the individual components.

Structuring the layer of lithium niobate in addition can comprise e.g. a partial removal of the layer of lithium niobate, e.g. by dry etching. For example, the partial removal of the layer of lithium niobate is effected in such a way that it forms a waveguide area that extends along the waveguide core or the portion of the waveguide core (as seen parallel to the substrate) as well as two depressions laterally adjoining the waveguide area. The depressions are located on mutually opposite sides of the waveguide area— as seen in a direction perpendicular to the waveguide area and parallel to the substrate. The waveguide area has a larger thickness than laterally adjoining residual portions of the original lithium niobate layer, which possibly are still present in the depressions. It is possible in particular that the layer of lithium niobate is not removed in its waveguide area and/or is completely removed in the areas of the depressions. It is also conceivable that the width of the waveguide area differs from the width of the waveguide core (measured parallel to the substrate); e.g. the waveguide area of the structured lithium niobate layer is broader than the waveguide core. For example, the width of the waveguide area of the structured lithium niobate layer is not more than 1.2 times or not more than 1.5 times the width of the waveguide core. The waveguide area of the structured lithium niobate layer can of course also have at least approximately the same width as the waveguide core.

In another exemplary embodiment of the solution the waveguide core includes two portions, wherein a first portion of the waveguide core is produced before arranging the layer of lithium niobate and a second portion of the waveguide core is produced after arranging the layer of lithium niobate. In particular, after manufacturing the two portions of the waveguide core, the first and the second portion are located on sides of the layer of lithium niobate facing away from each other. The waveguide produced in this way has lower optical losses e.g. due to the lower overlap of the optical modes guided in it with the cladding material.

Arranging the at least one contact structure (e.g. in the form of an electrode) for electrically contacting the layer of lithium niobate comprises e.g. producing at least one metal layer (e.g. a gold layer) on a side of the layer of lithium niobate facing away from the substrate.

For example, producing the optical waveguide or the part of the optical waveguide comprises manufacturing a first cladding layer (e.g. a layer that includes silicon dioxide or consists of silicon dioxide) on the substrate (e.g. by gas phase deposition), wherein the waveguide core or the portion of the waveguide core is produced on the cladding layer. Producing the waveguide core or the portion of the waveguide core includes for example producing a waveguide core material layer (e.g. a layer that consists of silicon nitride or includes silicon nitride) on the first cladding layer and structuring the waveguide core material layer (by wet or dry etching). Subsequently, a further (second) cladding layer can be produced (e.g. again by gas phase deposition). The second cladding layer in particular includes the same material as the first cladding layer.

Subsequently the layers produced, in particular the second cladding layer and possibly the underlying waveguide core material layer, are planarized and/or polished. Planarizing and/or polishing is effected e.g. by CMP—chemico-mechanical polishing. It is conceivable that the second cladding layer here is removed completely, e.g. in a region above the waveguide core, and thus after planarizing/polishing adjoins the waveguide core only laterally. It is also possible, however, that the second cladding layer is not removed completely above the waveguide core. In this case, the layer of lithium niobate is not arranged directly on the waveguide core, but on the remaining material of the second cladding layer. Due to the chemico-mechanical polishing for example a very planar surface (e.g. with a roughness in the nm range)

is produced, to which the layer of lithium niobate can be connected (in particular by a bonding method, as described above).

After connecting the lithium niobate layer to the optical waveguide, thinning of the lithium niobate layer to a desired target thickness and/or polishing of the lithium niobate layer can be effected; e.g. likewise by CMP. The target thickness of the lithium niobate layer (as well as the thicknesses of the cladding layers and/or of the waveguide core material layer) in principle are freely selectable and in particular are fixed in dependence on the optical component to be manufactured. Structuring of the layer of lithium niobate in particular is effected after thinning of the lithium niobate layer. In a further step, e.g. the at least one contact structure is produced and/or at least one passivation layer (e.g. of silicon oxide) is manufactured.

The solution also relates to an optical component, in particular manufactured by the method of the solution, comprising a substrate;

an optical waveguide arranged on the substrate with a waveguide core or a portion of the waveguide core, wherein the waveguide core or the portion of the waveguide core includes silicon nitride, a polymer or a III-V semiconductor material;

at least one layer of lithium niobate, which is located on a side of the waveguide core or of a portion of the waveguide core facing away from the substrate, wherein the layer of lithium niobate is configured in the form of a structure that extends along the waveguide core or the portion of the waveguide core, and/or on the layer of lithium niobate at least one contact structure is arranged for electrically contacting the at least one layer of lithium niobate.

The optical component according to the solution in particular is an electro-optical component, e.g. in the form of an electro-optical modulator (such as a modulator with low optical transmission losses and/or a high-speed modulator for optical communication systems), or in the form of a (particularly low-loss) switch for applications in quantum communications or other communications technology.

The exemplary embodiments described above with respect to the method according to the solution can of course analogously be used for developing the optical component according to the solution. For example, the waveguide core comprises a first and a second portion, wherein the first and the second portion are disposed on sides of the layer of lithium niobate facing away from each other. It is also conceivable that the waveguide core includes silicon nitride or consists of silicon nitride.

BRIEF DESCRIPTION OF THE DRAWINGS

The solution will be explained in detail below by means of exemplary embodiments with reference to the Figures.

DESCRIPTION OF THE INVENTION

Figure 1:
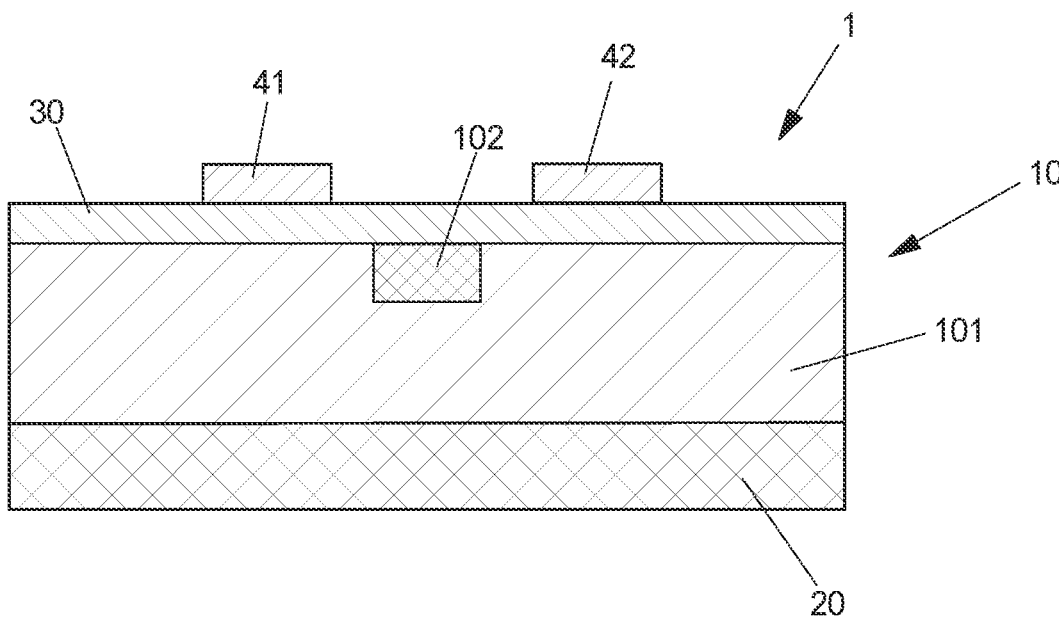
FIG. 1 schematically shows a cross-section of an optical component according to a first exemplary embodiment of the solution.

FIG. 1 shows a cross-section of a partial section of an electro-optical component 1, for example of a modulator or a switch. The electro-optical component 1 comprises at least one optical waveguide 10 arranged on a substrate 20. The optical waveguide 10 includes a waveguide cladding 101 and a waveguide core 102 embedded in the same. Above the waveguide core 102, i.e. on a side of the waveguide core 102 facing away from the substrate 20, a layer 30 of lithium niobate is located. The lithium niobate layer 30 extends completely across the waveguide core 102 and at least across a part of the waveguide cladding 101.

In addition, two contact structures in the form of a first and a second electrode 41, 42 are located on the layer 30 of lithium niobate, which—as seen along the main plane of extension of the substrate 20—are arranged on different sides of the waveguide core 102. By means of the electrodes 41, 42, the layer 30 of lithium niobate can be contacted electrically so that by applying a voltage to the electrodes 41, 42 the refractive index of the lithium niobate layer 30 can be changed. The refractive index of the lithium niobate layer 30 in turn contributes to an effective index of refraction experienced by an optical mode guided in the waveguide 10, so that by applying a voltage to the electrodes 41, 42 the propagation of the optical mode can be influenced.

The waveguide core 102 for example is made of silicon nitride, while the waveguide cladding 101 is formed of silicon dioxide. The substrate 20 in particular is a silicon substrate, e.g. a wafer made of silicon. However, the solution is not limited to this material system; rather, the waveguide core 102 and the waveguide cladding 101 each might also be made of a polymer or a III-V semiconductor material. The electrodes 41, 42 in particular are configured in the form of a structured metal layer. The metal layer in particular comprises a structured gold layer.

For manufacturing the electro-optical component 1 shown in FIG. 1, as already explained above, a first cladding layer initially is arranged on the substrate 20 and a layer of the material of the waveguide core 102, for example said silicon nitride, is produced on the first cladding layer. Subsequently, the core material layer is structured, in particular by removing lateral areas of the core material layer, so that the rectangular cross-section of the waveguide core 102 shown in FIG. 1 is obtained. After structuring the core material layer, a second material layer is produced, in particular from the same material as the first cladding layer, which fills up the areas laterally of the waveguide core 102 and also extends above the core 102.

As likewise has already been explained above, this second cladding layer is planarized; for example, it is removed completely above the waveguide core 102. Subsequently, the layer 30 of lithium niobate initially arranged on a second substrate (not shown), in particular on a second wafer, is connected to the waveguide 10 by means of a bonding method, i.e. in particular connected to a surface of the waveguide core 102 and a surface of the waveguide cladding 101 each extending laterally of the waveguide core 102. Connecting the lithium niobate layer 30 can be effected by means of an (in particular adhesive) intermediate layer (not shown). It is also conceivable that the lithium niobate layer 30 is directly bonded to the surfaces of the waveguide cladding 101 and the waveguide core 102. In addition, it is conceivable that said second cladding layer is not removed completely so that connecting (bonding) the lithium niobate layer 30 to the waveguide 10 is effected via the remaining second cladding layer (and possibly via a further intermediate layer). After bonding the lithium niobate layer 30 to the waveguide 10, the second substrate (and possibly further material layers located between the lithium niobate layer 30 and the second substrate) is removed.

Figure 2:
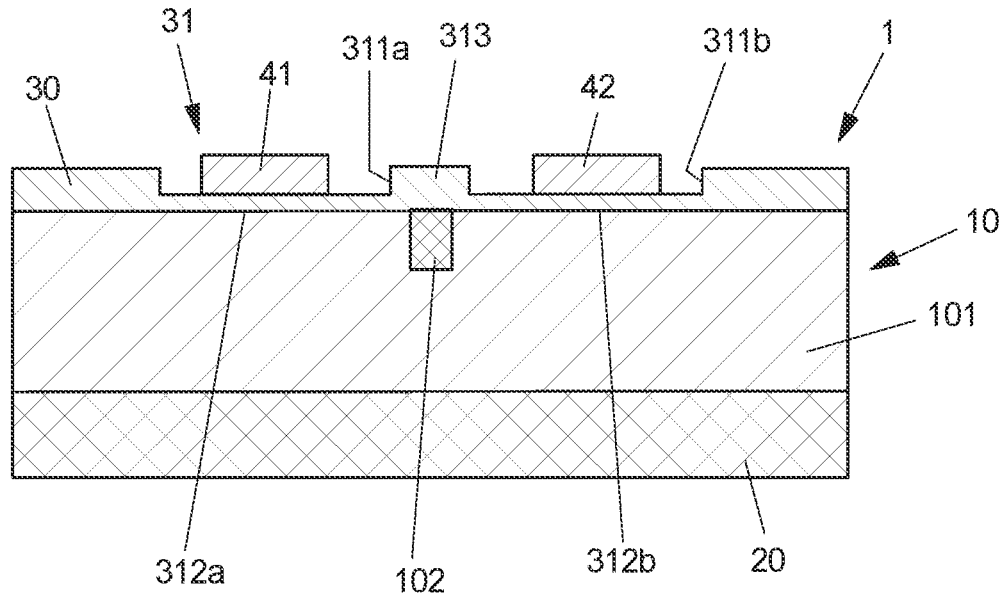
FIG. 2 schematically shows a cross-section of an optical component according to a second exemplary embodiment of the solution.

A modification of the electro-optical component 1 of FIG. 1 is shown in FIG. 2. Accordingly, the electrodes 41, 42 are arranged in a structured area 31 of the layer 30 of lithium niobate. The structured area 31 comprises depressions 311*a*, 311*b* laterally of the waveguide core 102, in which the lithium niobate layer 30 has partly been removed (except for areas 312*a*, 312*b* with a lower residual thickness) and in which the electrodes 41, 42 are arranged. It is also conceivable that the lithium niobate layer 30 is removed completely to produce the depressions 311*a*, 311*b*. Above the waveguide core 102 a waveguide area 313 of the lithium niobate layer 30 is disposed, which is defined by the depressions 311*a*, 311*b* and which—as seen parallel to the substrate 20—at least sectionally follows the course of the waveguide core 102 and which has a larger thickness—as seen perpendicularly to the substrate 20—than the areas 312*a*, 312*b*. In addition, the waveguide area 313 has a slightly larger width (expansion parallel to the substrate 20) than the waveguide core 102. It is also conceivable, however, that the waveguide area 313 at least approximately has the same width as the waveguide core 102 or a smaller width than the waveguide core 102.

Figure 3:
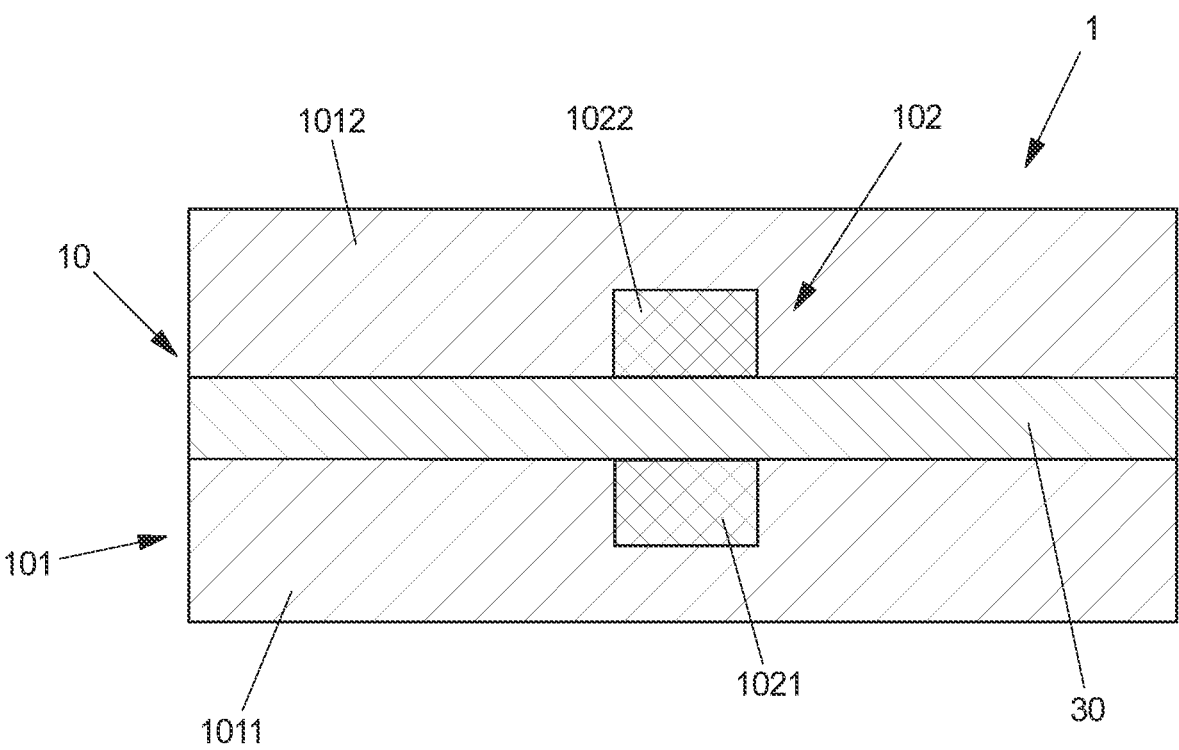
FIG. 3 schematically shows a cross-section of an optical component according to a third exemplary embodiment of the solution.

The electro-optical component 1 according to the solution, which is shown in FIG. 3, includes an optical waveguide 10 with a waveguide core 102, wherein the waveguide core 102 has a first and a second portion 1021, 1022, which are disposed on sides of the layer 30 of lithium niobate facing away from each other. The portions 1021, 1022 of the waveguide core 102 each are surrounded by first and second portions 1011, 1012 of a waveguide cladding 101. The portions 1011, 1012 of the waveguide cladding 101 correspondingly extend analogously to the portions 1021, 1022 of the waveguide core 102 likewise on sides of the layer 30 of lithium niobate facing away from each other. The lower portion 1011 of the waveguide cladding 101 is arranged on a (non-illustrated) substrate (analogously to FIGS. 1 and 2). For example, the waveguide core 102, i.e. the portions 1021, 1022, is made of silicon nitride, and the waveguide cladding 101 (its portions 1011, 1012) of silicon dioxide. The substrate used can again be a silicon substrate, e.g. a wafer made of silicon. Other material systems, however, likewise are possible, as already explained above.

The manufacture of the component shown in FIG. 3 initially is effected analogously to the method described in connection with FIG. 1. After bonding the layer 30 of lithium niobate to a lower part of the waveguide 10, i.e. to the first (lower) portion 1011 of the waveguide cladding 101, and to the first (lower) portion 1021 of the waveguide core 102, a layer of the material of the second portion 1022 of the waveguide core 102 is produced on the lithium niobate layer 30 and its rectangular cross-section is obtained by laterally removing this material. The width (parallel to the substrate or to the lithium niobate layer 30) of the second portion 1022 of the waveguide core 102 in particular corresponds to the width of the first portion 1021 of the waveguide core 102. Subsequently, the material of the upper portion 1012 of the waveguide cladding 101 is deposited. Further processing steps can follow, for example machining (e.g. planarizing) the upper portion 1012 of the cladding layer 101 and/or mounting electrodes for contacting the layer 30 of lithium niobate.

The invention claimed is:
1. A method for manufacturing an optical component, comprising the following steps:
    producing at least one optical waveguide or a part of an optical waveguide on a substrate, wherein producing the optical waveguide or the part of the optical waveguide comprises:

arranging a cladding layer on the substrate; and producing a waveguide core or a portion of a waveguide core on the cladding layer, wherein the waveguide core or the portion of the waveguide core includes silicon nitride, a polymer or a III-V semiconductor material, and wherein the waveguide core or the portion of the waveguide core is produced on the cladding layer by producing a core material layer of the material of the waveguide core or the part of the waveguide core on the cladding layer and removing lateral areas of the core material layer so that a rectangular cross section of the waveguide core or the portion of the waveguide core is obtained;

after producing the waveguide core or the portion of the waveguide core on the cladding layer, producing a further cladding layer on the cladding layer, the further cladding layer filling up areas lateral to the waveguide core of the portion of the waveguide core and extending above the waveguide core or the portion of the waveguide core;

planarizing and/or polishing the further cladding layer to at least partially remove the further cladding layer in a region above the waveguide core or the portion of the waveguide core;

after the planarizing and/or polishing of the further cladding layer, arranging at least one layer of lithium niobate on a side of the waveguide core or of the portion of the waveguide core facing away from the substrate and on the remaining material of the further cladding layer, wherein after arranging the at least one layer of lithium niobate, at least one of the following steps is carried out: structuring the at least one layer of lithium niobate, producing a further portion of the waveguide core and/or arranging at least one contact structure for electrically contacting the at least one layer of lithium niobate.

2. The method according to claim 1, wherein the layer of lithium niobate is connected to the optical waveguide or the part of the optical waveguide by means of a bonding method.

3. The method according to claim 2, wherein the bonding method comprises connecting the layer of lithium niobate to the optical waveguide or the part of the optical waveguide by means of at least one intermediate layer.

4. The method according to claim 1, wherein the substrate is a first wafer on which several optical waveguides or several parts of optical waveguides are produced at the same time to produce a plurality of optical components, wherein the layer of lithium niobate initially is arranged on a second wafer that is removed after carrying out the bonding method.

5. The method according to claim 1, wherein the structuring of the layer of lithium niobate comprises a partial removal of the layer of lithium niobate.

6. The method according to claim 5, wherein the partial removal of the layer of lithium niobate is effected in such a way that it forms a waveguide area that extends along the waveguide core or the portion of the waveguide core, wherein lateral depressions of the layer of lithium niobate each adjoin the waveguide area.

7. The method according to claim 1, wherein the portion of the waveguide core represents a first portion of the waveguide core, which is produced before arranging the layer of lithium niobate, wherein a second portion of the waveguide core is manufactured after arranging the layer of lithium niobate.

8. The method according to claim 7, wherein the first and the second portion of the waveguide core are produced on sides of the layer of lithium niobate facing away from each other.

9. The method according to claim 1, wherein arranging the at least one contact structure for electrically contacting the layer of lithium niobate comprises producing at least one metal layer on a side of the layer of lithium niobate facing away from the substrate.

10. The method according to claim 1, wherein the waveguide core or the portion of the waveguide core includes silicon nitride, and the optical waveguide or the part of the optical waveguide comprises a waveguide cladding including silicon dioxide.

11. An optical component, comprising:

a substrate;

an optical waveguide arranged on the substrate with a waveguide core or a portion of the waveguide core, wherein the waveguide core or the portion of the waveguide core includes silicon nitride, a polymer or a III-V semiconductor material;

at least one layer of lithium niobate, which is located on a side of the waveguide core or of a portion of the waveguide core facing away from the substrate, wherein the layer of lithium niobate is configured in the form of a structure that extends along the waveguide core or the portion of the waveguide core, and/or on the layer of lithium niobate at least one contact structure is arranged for electrically contacting the at least one layer of lithium niobate, wherein the waveguide core includes first and second portions, wherein the first portion is disposed on a first side of the layer of lithium niobate facing towards the substrate and the second portion is disposed on a second side of the layer of lithium niobate facing away from the first side and the substrate, and wherein the first and the second portions each are surrounded by a waveguide cladding.

12. The optical component according to claim 11, wherein the waveguide core includes silicon nitride.

* * * * *